Dec. 17, 1963 H. G. QUASE 3,114,384
UNDERWATER STORAGE SYSTEM
Filed Jan. 12, 1959 5 Sheets-Sheet 1
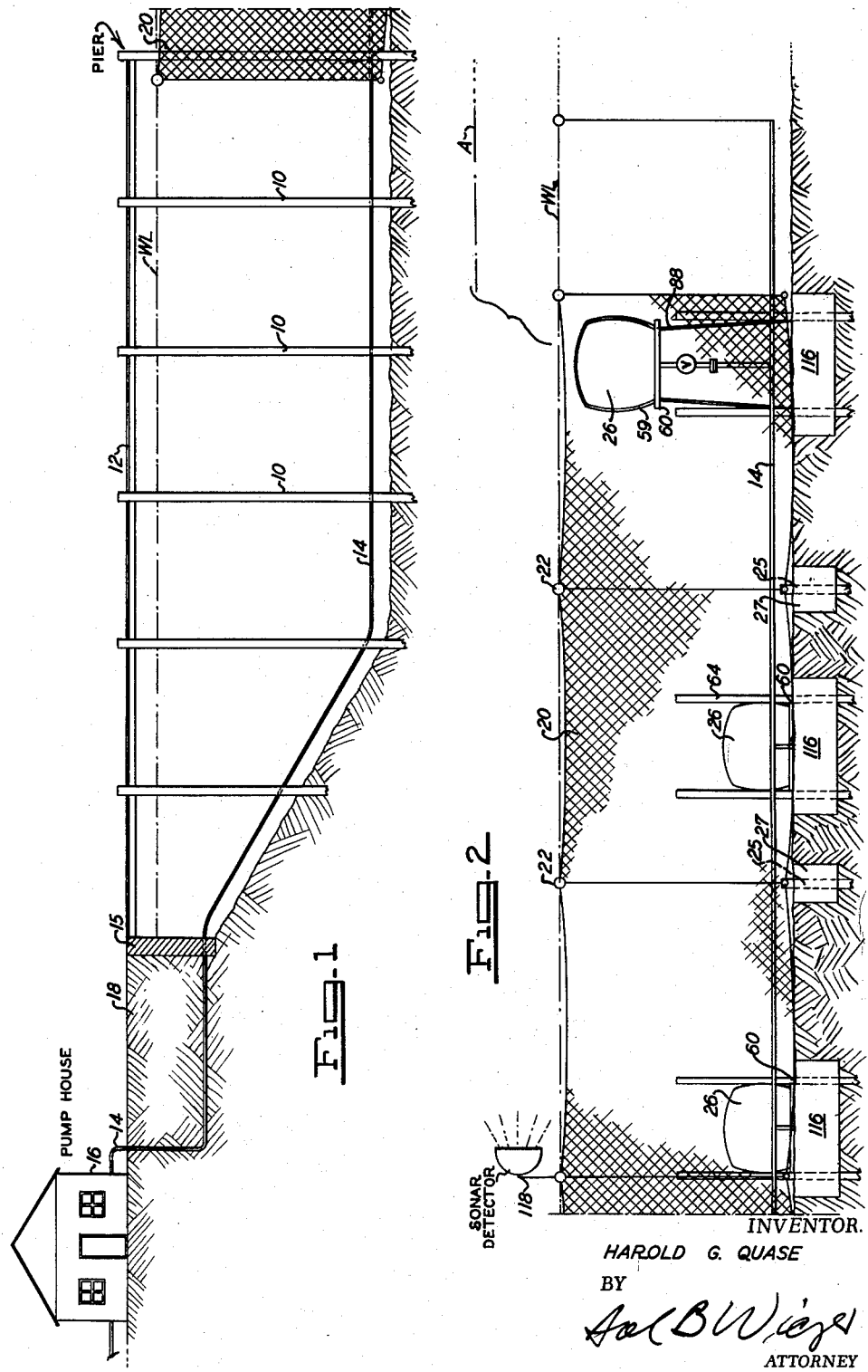
INVENTOR.
HAROLD G. QUASE
BY
ATTORNEY

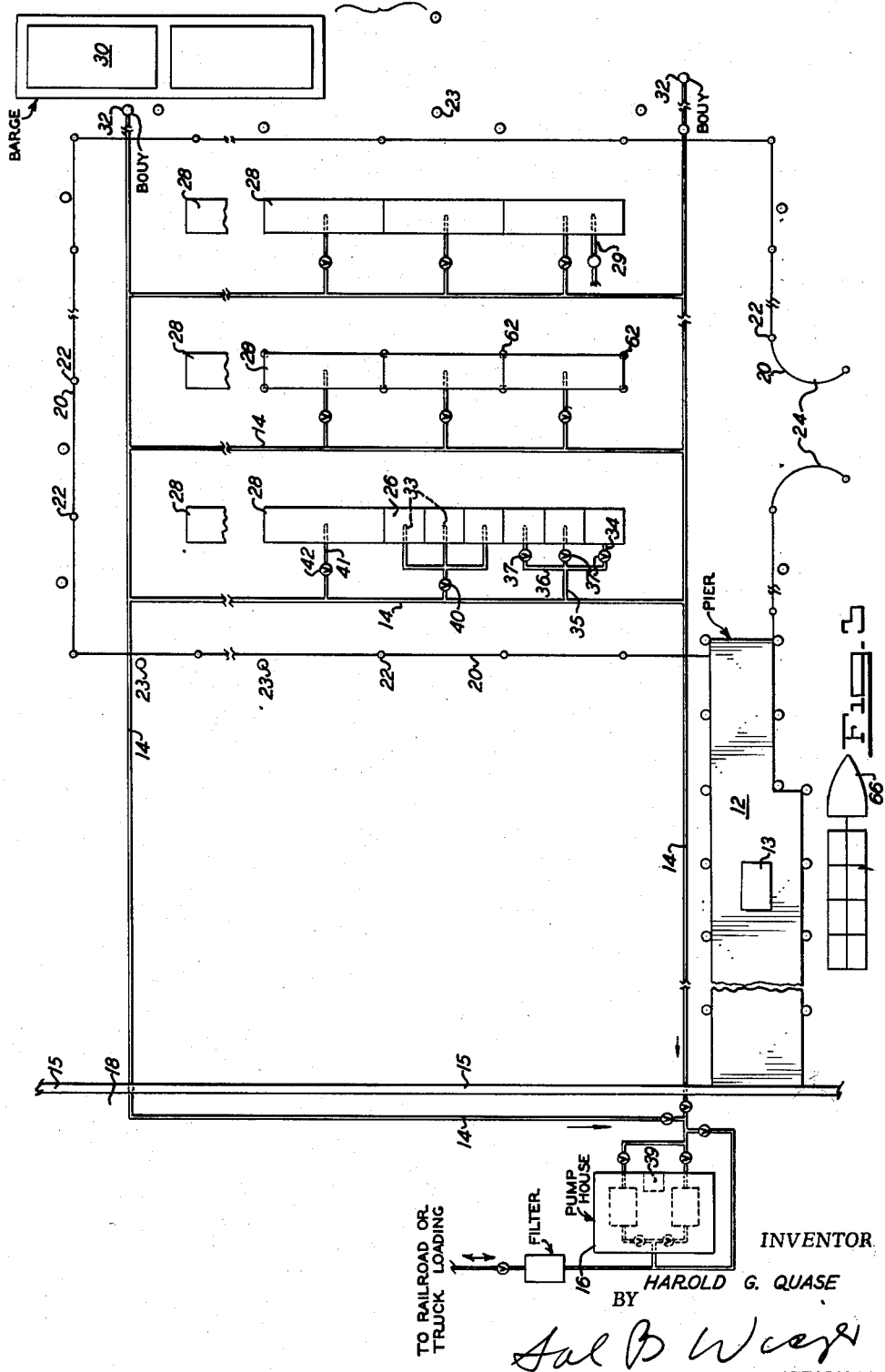

Dec. 17, 1963 H. G. QUASE 3,114,384
UNDERWATER STORAGE SYSTEM
Filed Jan. 12, 1959 5 Sheets-Sheet 3
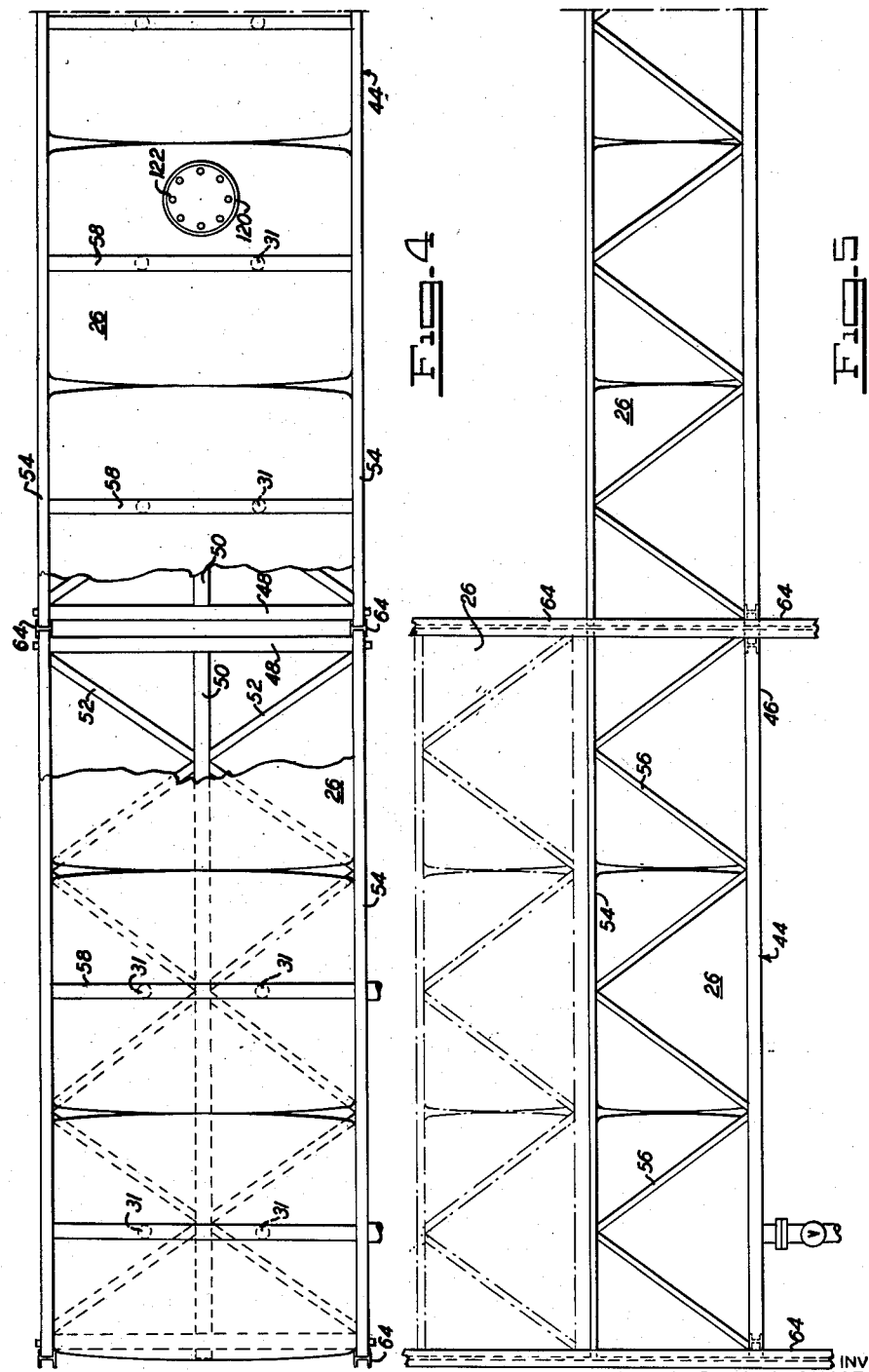
INVENTOR
HAROLD G. QUASE
BY
ATTORNEY

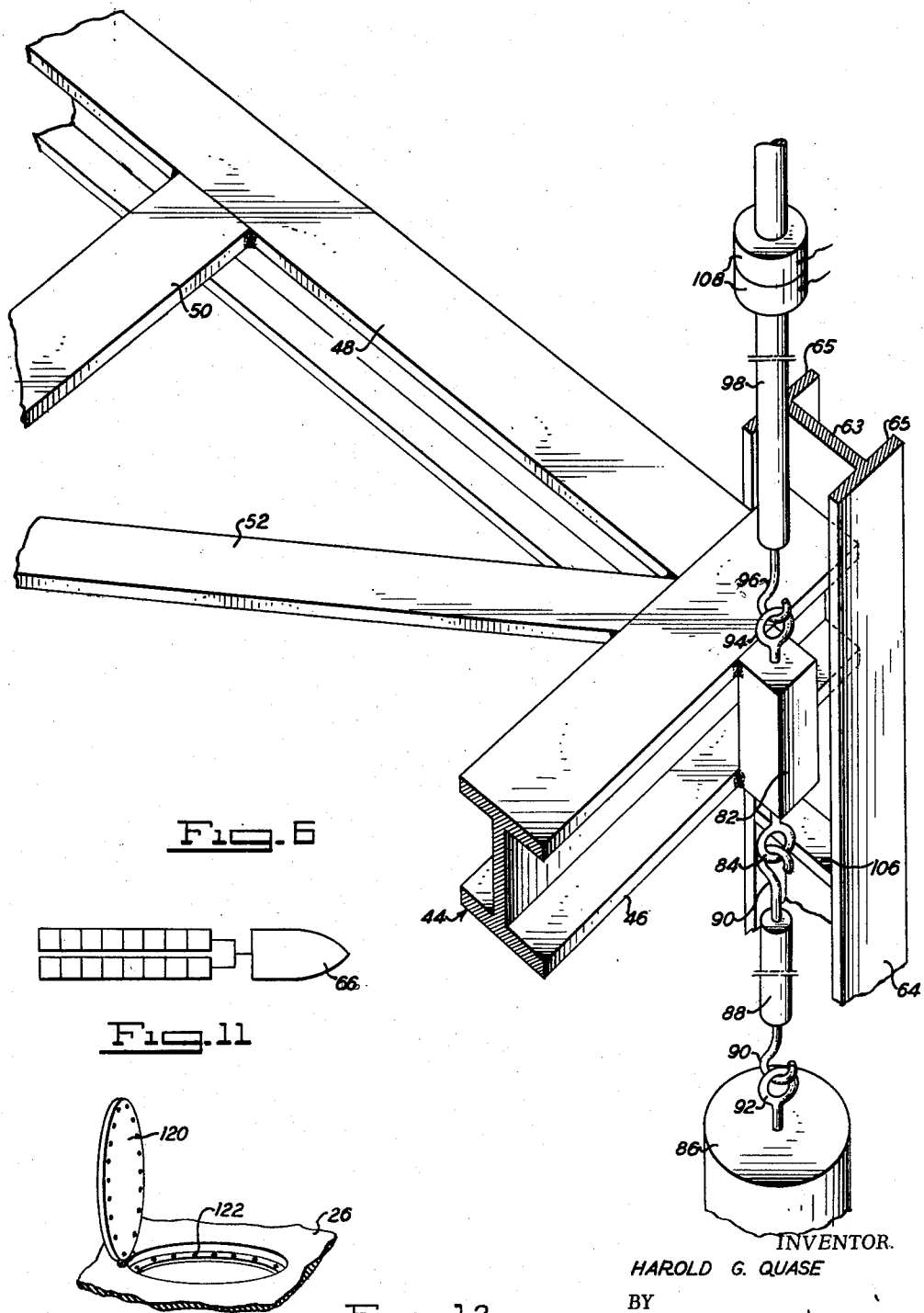

Dec. 17, 1963   H. G. QUASE   3,114,384
UNDERWATER STORAGE SYSTEM
Filed Jan. 12, 1959   5 Sheets-Sheet 5
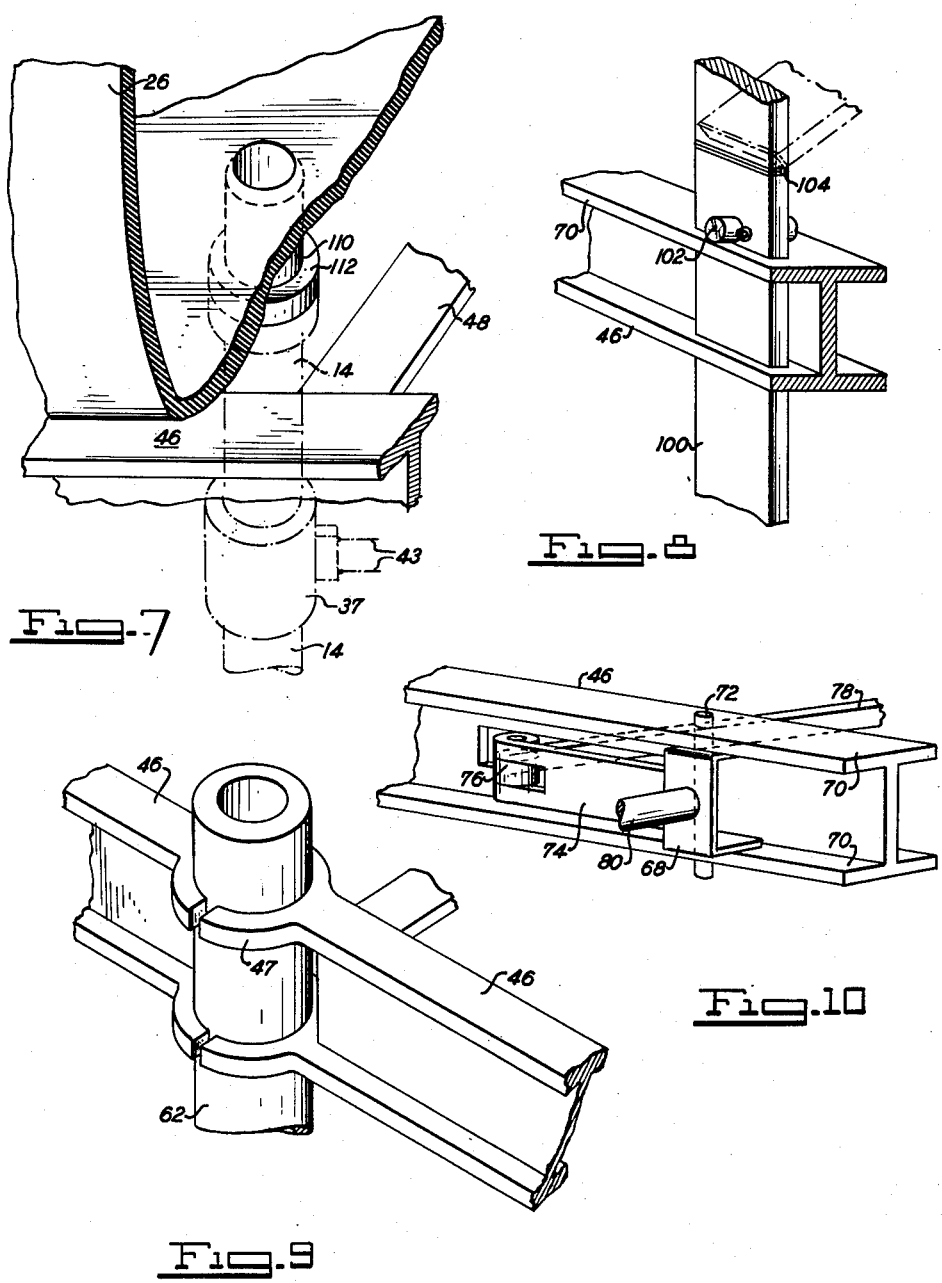
INVENTOR.
HAROLD G. QUASE
BY
ATTORNEY

United States Patent Office 3,114,384
Patented Dec. 17, 1963

3,114,384
UNDERWATER STORAGE SYSTEM
Harold G. Quase, 9620 Hillridge Drive, Rock Creek Hills,
Kensington, Md.
Filed Jan. 12, 1959, Ser. No. 786,434
8 Claims. (Cl. 137—236)

This invention relates to an underwater storage system for strategic materials, solid, liquid or gaseous. More particularly the present invention provides a highly flexible system for safely storing such materials in containers which are emplaceable in submerged storage position, which are fillable and dischargeable from said submerged position as individual containers or as a group in situ as part of the storage system, but which in preferred construction are also removable for portable transfer from the submerged storage position as one or several container units to remote places for use of the material or for refilling of empty containers and return to the system.

One object of this invention is to provide a storage system of great safety for securing strategic materials in protected underwater position with respect to nearby population groups, such as cities, and substantially hidden as strategic supplies.

Another object is to so store such materials underwater that they may be simultaneously secure and safely stored, but flexibly available for easy access comprising emplacement and discharge from the underwater position.

Any strategic material disposable in containers, such as liquid or gaseous fuels, solvents, fresh water, explosives or solid materials such as food or medicinal supplies and the like, may be so stored, including, of course, any other useful materials without limit.

The system hereof provides superior storage for dangerous products, particularly flammable gases and liquids, such as petroleum supplies or explosives, underwater, thereby to very greatly reduce the fire or explosion hazard to nearby population centers which the stored supplies service. The system, moreover, is useful to store strategic materials against contamination by radio activity under the natural protective barrier of a substantial depth of water.

While the underwater factor alone provides great safety, the system is flexible to further include added safety devices, such as fire, and sonar warning of the approach of enemy or other sea craft. This storage system again is protected strategically by being hidden from aerial observation and incidental destruction by near-miss bombardment by highly destructive modern weapons.

The system hereof in preferred construction is extremely flexible in that the materials stored may be sealed in large water proofed containers and each made a part of the storage system whereby such container may be filled or discharged without removal from its submerged storage position by remote control valves and pumps or the like. Alternately, the container itself, or several in a group, may be removed from or emplaced in the system as a unit.

It is a further object, therefore, to provide a storage system having that degree of flexibility in which containers are added to, removed from, charged and discharged of their contents individually or in groups of several from their emplaced underwater storage position.

Another object is to provide a container handling system wherein the container itself is formed of flexible material, such as rubber of substantial strength to contain and secure for storage or transport large quantities of such storable materials and which may be collapsible under hydrostatic pressure upon the deformable container walls for ready filling and discharge of contents, including adjustment of buoyancy of the portable container, including container handling means comprising a pallet or cradle for transport and secure emplacement of one or several containers in the system.

It is among further objects to develop an underwater storage system including shore and sea based facilities for servicing, including filling and discharge piping for such underwater storage systems; protection of such underwater storage system by a surrounding network securing the same further against submarine attack, including sonar detection of hostile underwater and surface craft.

Other objects of the invention will be inherent in the further description made in reference to the several figures of the drawings which are substantially diagrammatic and exemplary to explain and illustrate the preferred examples of such system and its operation, but it will be understood that the invention is not limited thereto.

In the drawings:

FIG. 1 shows an elevational diagram of the left-hand shore portion supply handling facilities such as a shore mounted pump house, piping and a pier extending from the shore to the submerged system;

FIG. 2 is an extension of FIG. 1 from its right-hand portion and further illustrates the storage system and surrounding network;

FIG. 3 illustrates such storage system schematically and in simplified overall plan;

FIG. 4 is a plan view of assembled containers on cradles in the underwater storage system;

FIG. 5 is an elevational view of FIG. 4 showing stored containers and cradle handling means therefor;

FIG. 6 is an enlarged perspective detail illustrating the mounting of a cradle for stored support and guided emplacement and removal with an H-beam guide;

FIG. 7 is a detail illustrating a means for securing a cradle and container in the storage system;

FIG. 8 illustrates a means for guiding a cradle from the surface and underwater support and for mounting of several cradles in a vertical tier;

FIG. 9 illustrates a detail of alternate type of cylindrical piling;

FIG. 10 illustrates a detail for mounting wheels on a cradle for land portability;

FIG. 11 illustrates a floating sea train of several cradles laden with containers; and FIG. 12 is a further detail of the top of a flexible container showing an enlarged man-hole size access opening and closure for emplacement and removal of solid materials.

Referring to FIGS. 1 and 2, the system viewed in elevation comprises a plurality of ordinary piles 10 which may support a pier 12 extending above the water and also support submerged piping 14 which leads from the underwater storage system, disposed to the right-hand portion of FIG. 1 and continuing as FIG. 2, to a pump house 16 and other usual land based material handling facilities. For instance, upon the land near the shore diagrammatically shown to be mounted near the shore line 18 for transfer of fluid to and from the storage system as will appear. The storage area as illustrated in FIG. 2 is preferably surrounded by a heavy metal protective net 20 which may depend and be supported by suitably placed floats 22 from the water surface illustrated in the dashed line. The net is of sufficient height to protectively extend to the bottom of the storage space. In an alternate modified form illustrated by the alternate water level line A, and to impart adequate concealment to the entire storage system, the floats 22 may be adjusted to support the top of the screen from a submerged position. That is, the bottom of the net 20 may be secured to piles 25 driven into the sea bottom, and usually there secured by concrete blocks 27, and floats 22 support the net 20 upward therefrom in tension at a point substantially beneath the surface A of the sea, whereby the storage system is not visible from the surface when a desired concealment of the entire storage system exists. As illustrated in schematic plan, FIG. 3, the system comprises spaced rows 28 of storage containers 26, each of which is separated by a network of loading and unloading piping or product ducts 14 extending beneath the water surface from the storage area to land facilities, for instance, the pump house 16 and other appurtenances, for instance, truck and railroad sidings for land transport of commodities to and from the storage area. All such appurtenances can be located on the shore side 18 of the sea wall 15.

Moreover, the pier 12 may be used for material handling devices such as an overhead traveling crane or derrick 13 for removal of floating containers 26 and pallets or cradles from the sea train and transfer them bodily to land vehicles or railroad cars operating thereon. Alternately, only dry or liquid cargo may be unloaded from the containers by conventional material handling devices 13 mounted on the pier 12. The storage system may also be loaded and unloaded from the sea and for this purpose a barge 30 may bring or remove supplies, such as fuel oil to a fueling or defueling station 32 comprising a buoy to which is mounted duct connectors and valves for either adding or withdrawing liquid fuel from the system. The transfer of supply fluids to and from the system may be done in one or more fluid duct lines 14. Containers may also be transported to and from storage by helicopter (not shown).

The fluid containers 26, being preferably of reinforced but flexible rubber, collapsible when immersed under substantial hydrostatic pressure of the water head thereabout, needs but one line for both charging and discharging. However, duplicate or several lines 29 (shown only as a minor stub) may be used, particularly where a different fluid product is to be conveyed. For instance, oil withdrawn from a container may be replaced by a gas such as natural gas for purposes of enhancing the buoyancy by preventing collapse of the empty container, such natural gas being supplied from an independent but similar fluid transfer system. While generally only a single duct will be fastened to a container as shown in FIG. 7, two ducts may be used and attached to a container as suggested in the dotted circular lines 31 of FIG. 4.

As will appear, the containers 26 are preferably discharged from the bottom through lines 33 (110) extending therebeneath, but, if desired, the discharge line may be in the side of the container 34 for purposes of accommodating variation in the character of the product. Each duct 14, as shown in FIG. 3, generally attaches to several containers through a branching line 35 connecting with manifolding lines 36, the flow in each of which may be controlled from a remote point through a solenoid valve 37 electrically, the control unit 39 being located in the pump house 16. With each valve thus independently controllable, each individual container may be discharged by the appropriate electrical signal from the valve control block 39. However, it may be desirable to discharge a small group of several containers at once in which event a single valve 40 controlling several containers 26 may be actuated in the same way to discharge all containers simultaneously by the single signal operation of a single valve 40. Again, instead of a plurality of small containers, one large single container 28 may be used which is discharged through a single line 41 controlled by a valve 42.

As pointed out above, the group of supply containers 26 are surrounded by a protective net 20 supported by floats 22. Inasmuch as additional fire protective devices may be needed, fire extinguishing units, such as foamite bottles 23, may be disposed about the area and attached to the nets as an additional safety factor.

As further described below, preferably at least some of the containers 26 and cradles, pallets or handling devices associated with one or several containers, are portable and so may be emplaced and readily removed from the positions shown in FIG. 3. For this purpose a gateway opening of the net 20 for supply and removal of portable containers is shown at the point 24.

As illustrated in FIGS. 2, 4, 5 and 7, a single container 26, preferably formed of a heavy cord or fabric reinforced rubber wall of substantial size ranging upward from a few hundred to several thousand gallons of fluid capacity and of great strength and substantial flexibility, is used as a unit storage device. Such container of itself, discounting some elements which may be of metal, such as fluid ducts, is substantially floatable as rubber in water, and readily stores either gaseous, liquid or solid supplies or combinations thereof which render the package of lower than water specific gravity to be adequately buoyant to float on the surface of the water. In fact, since the device usually has such buoyancy which is readily adjustable by the product packaged, it may be mounted on a supporting cradle or pallet serving the purpose of anchoring the container in submerged position in the system as well as for transporting the container or an assembly of several such containers.

Some supply containers may be substantially permanently fixed at the underwater storage site for filling and discharging of fluid by ducts. Some containers may be formed of rigid materials which, however, would need firm anchoring to overcome large variation of buoyancy with charge and discharge of fluid contents; although rigid wall containers with volume varying means such as typical large commercial gas storage tanks now commonly used, may be used here with appropriate anchoring. However, as stated, the preferred storage containers are portable, and in further preference are flexibly collapsible.

Such flexible walled containers are best handled with a supporting means such as a pallet or cradle, cooperative for ready handling by material handling devices. In the present system, moreover, the pallet or cradle usefully cooperates with guiding and storage securing devices as will appear. Such pallet or cradle 44 as shown in FIG. 6 comprises a metal base having side members 46 which may be any kind of stiffening structural elements, tubular, angle or channel irons or, as shown, I or H-beams. The side members 46 can be secured together by cross members 48, reenforced by one or more longitudinal stiffening members 50 and diagonal stiffening members 52. Preferably the upper horizontal member 54 (FIG. 5) is formed of channel iron and the diagonal reenforcing elements 56 preferably are of angle iron. The several vertical side framing members 54 and 56 are secured together, as by welding to each other and to the lower side members 46, as a truss, greatly reenforcing the base and forming a cradle with side support members as shown, or by omission of the side members, a pallet, either being useful for handling one or several flexible containers 26 as a unit.

As pointed out, each container 26 has substantial buoyancy in view of its low gravity rubber structural material as well as the supply content. Even combined with the cradle, the entire assembly may be buoyant, the buoyancy variable somewhat with the contents and by further reduction of the weight of the cradle material. Thus, while the cradle may be formed of heavy rust resistant ferrous metal, for some materials it is desirable to form it of a lighter metal, such as aluminum, magnalium and the like. Since the assembly can float and may also be adjusted in buoyancy, it is desirable to fasten the containers securely to the cradle by straps 58 mounted to extend merely across the top of the cradle between opposite upper side members 54.

Alternatively, of course, if the side arms are omitted from the supporting base so that the structure is that of a mere pallet 60, as shown in FIG. 2, then the straps may extend completely around each container 26 as modified straps 59, that is, from one side of the pallet, i.e. a lower side member 46, to the other, to secure the pallet and container assembly together as a unit.

The storage system proper comprises vertical guide members disposed at intersecting corners of each cradle, one guide member for adjacent corners, for instance, as shown diagrammatically in FIG. 3. Such guide members may be vertical tubes 62, one of which is shown in enlarged detail FIG. 9, all disposed in rows at both sides and ends of the several aligned cradles, and serving as guide members for vertical emplacement and removal of a cradle from its storage position. While in ultimate simplicity such guide members may be tubular, it is preferred that the vertical guide members be H-irons 64 as shown in FIG. 4 and in enlarged perspective detail FIG. 6. The rectangular column space or channel formed on both sides of the web member 63 of each H-beam 64, with its side flanges 65, forms a superior vertical guideway for each rectangular corner for vertical raising and lowering of a pallet 60 or cradle 44. For this purpose the side member 46 of the cradle 44 as shown in FIG. 6 is sized to slidingly fit in the channel between the flanges 65, with each end abutting the web portion 63 of an H-beam 64. In order to cooperate with the H-beam guide structure, the forward and after cross member 48 of the pallet or cradle are indented, set inward from the ends of the side members 46, a short but sufficient distance to allow the side members 46 to extend into the channel or guideway portion of the H-beam. Such indented distance is less than about one-half the width of a flange 65 for sliding guiding support and non-binding clearance of the four corners of a pallet or cradle in the four vertical channels of H-beams 64 disposed at each corner. Of course, as illustrated in FIGS. 3, 4 and 5, the opposite side of each H-beam forms a guideway for one end of another cradle or pallet so that two or many may be disposed in a long row substantially as illustrated schematically in FIG. 3.

As mentioned, the assembly of a cradle and several containers is preferably buoyant. Accordingly, several of them may be towed afloat in the waterway above and approaching the storage area as several container laden cradles or pallets lashed together comprising a sea train and towed by any sea craft such as a tugboat or barge 66 to or from the storage area for purposes of conveying the material elsewhere, or for refilling. For instance, solid materials floated in a sea train of containers may be towed to the pier 12 as shown in FIG. 3, lifted by a crane or hoist mechanism 13 onto the pier which may have a conveyance means, truck, railroad car or the like on which the container can be emplaced for conveyance. Such sea train is further illustrated in FIG. 11. The several cradles may be assembled, secured and towed from a framework 67 designed specifically for this purpose, the structure while being diagrammatically illustrated may be quite simple as is apparent from the structure shown.

In a modification as illustrated in small detail of FIG. 10, the pallet or cradle may be constructed to have wheels mounted thereon whereby the cradle container assembly may be towed on land, at least for short distances. For this purpose, the side members 46 may have steering knuckles 68 pivotally supported between flanges 70 by pivot pins 72 in opposite duplicate side arms 46. The steering knuckles 68 each have a steering arm 74 extending therefrom and pivoted at their ends 76 to a tie-rod 78. The steering knuckles 68 each support a stub axle 80 upon which a wheel may be rotatably mounted through non-friction bearings and secured for rotation in conventional manner. A towing tongue (not shown) as in a conventional towed wagon may be secured to tie-rod 78 for towing the pallet or cradle thus mounted on wheels, on land.

The floating cradle container assembly towed over the storage area can be drawn into storage emplacement position within the securing H-beams by attaching weights to the corners of the cradle or pallet sufficient to overcome the buoyancy of the container assembly therewith, and thus lower the assembly into the selected storage place, positioned as shown in FIGS. 2, 3, 4 and 5. For this purpose and referring to detail FIG. 6, the side members 46 of the cradle may have cleat blocks 82 secured thereto at each corner, each block having an eye 84 depending downward therefrom into which a weight 86 may be hung by a cable 88 having hooks 90, fastening from one end into eye 84 and the other into eye 92 of the weight member 86. The weight members fastened as thus described to the four corners (or other positions as needed) of the container and cradle assembly, serves to overcome the buoyancy. However, it will be apparent that the same same effect of lowering the assembly may be produced by cables 88 extending down to pulleys in the storage area (not shown), and drawn downward thereby for emplacement of a pallet, as diagrammatically shown in the right-hand portion of FIG. 2.

It is often desirable, however, to lower the assembly against the pull of the lower cables, with or without weights, more controllably, by cables played out by a winch, crane or one usual hoisting device aboard the surface craft to aid in the emplacement of the container-cradle assembly. For that purpose, upper eyes 94 are fastened in the upper ends of the cleat blocks 82 and a hook 96 of a guiding cable 98 is fastened, one to each corner of a pallet or cradle, to lower the assembly to the position shown in the detail FIG. 6, carefully aligning the four ends of the side arms 46 in the hollow portion between flanges 65, whereby the assembly is then guided to fixed storage position as shown in FIGS. 2, 3, 4 and 5.

The alignment of the assembly being lowered from surface craft to the proper position within the upright guiding H-beams 64 may be facilitated manually by divers, but other means for emplacing alignment may be provided. One useful device for that purpose is illustrated in FIG. 8. As there shown, the side arms 46, near their ends, are slotted vertically through both upper and lower flanges 70 to slidingly receive a vertical aligning bar 100, which may be fixed to arm 46 at any vertical position therein by cross pins 102. The bar 100 may extend vertically any useful distance for guiding alignment, for instance, a distance great enough to engage the hollow channel portion of the vertical H-beams, serving thereby to guide the descending assembled cradle and containers from the surface to storage position with the ends of the four arms 46 engaged in the slideway channels of the H-beams 64.

A similar construction using such bar 100 includes as slight modification one or more hinges at 104 allowing the upper portion to be swung horizontally. Several such bars 100 then, mounted vertically in the four corners of a cradle 44, and bent at right angles from the hinged portion 104, can serve as a horizontal sub-base support upon the top of a cradle-container assembly whereby a second cradle may be lowered within the vertical guideway defined by four H-beams 64, as illustrated in FIG. 5. Thus, two or more cradles and containers therein may be mounted vertically, one above the other, in a tier. Of course, there may be more hinges emplaced in different directions whereby the upper bar portion may be bent to other horizontal directions for such desired support purposes.

As shown in FIG. 2, a pallet 60, supporting one or several containers 26, may rest upon the sea or other water storage bottom. However, in order to avoid becoming embedded in silt, a stop member or ledge 106 (FIG. 6) may be mounted as a stop near the lower end of an H-beam a slight distance above the ground level of the sea thereby to support the pallet or cradle a short distance above the bottom.

While, as noted, such guiding bar 100 is of considerable utility to aid in alignment of a descending cradle within four upright H-beams for guiding to storage position sometimes aided by a sea diver. It may be useful with larger and more automatic alignment units to be able, after emplacement of a cradle-container assembly in storage position, to automatically release the cables. For that purpose a cable releasing means 108, diagrammatically illustrated in FIG. 6, may be used to release the cable electrically from a remote position. That cable release means may comprise a pair of electromagnets or other automatic coupling or cable releasing device as known in the art for release of the cable coupling from a remote point such as by an electrical impulse making or breaking a circuit. Similarly the cable 88 supporting weights 86 may be fitted with automatic cable releasing devices whereby the assembled pallet and containers thereon will tend to rise, floating in the water as illustrated in the right-hand portion of FIG. 2.

As shown in detail, FIG. 7, a container 26 may be formed of heavy reenforced rubber. Preferably the container is filled from the bottom through a permanently fitted tube 110 which carries a coupling flange 112 of any known type, for example the flanges may be coupled by clamps, or bolts (not shown), or the coupling may be a threaded joint. The duct 110 is coupled to a pipe 14, part of the piping system already described, or which may be a flexible rubber hose conduit which is integral with or joins to the piping system 14 described above for control of fluid flow through valve 37 (or others), suitably controlled remotely by solenoid elements 43, completing the fluid transfer system. Therefore, after emplacement of a cradle in the storage position, the ducts are connected manually by a diver performing the coupling of ducts, whereby each container becomes integrated into the storage system.

However, it is possible to effect automatic coupling inasmuch as the containers and cradle assembly are well aligned in the system as described. The coupling member 112 therefore may be automatically aligned with the emplacement of the entire assembly and the coupling sealed electromagnetically by modifying coupling flange elements 112 to be electromagnets. The upper flange 112, in an alternate coupling arrangement, may be omitted, the tube 110 coupling frictionally into a female coupling element, so that the coupling and uncoupling of the entire group of containers in the storage system may be done automatically, semi-automatically or manually as desired.

As indicated above the preferred guide member system has H-beams mounted at the four corners of each pallet or cradle. However, the guide members may have any other useful guiding shape, for instance they may be tubular. For this purpose the ends of a side member 46 of each cradle may be arcuate, as shown at 47 in FIG. 9, for sliding engagement of the cradle-container assembly about the outside of the tube, one or more disposed as shown in FIG. 3 at each corner of the cradle.

The system as described comprises storing of numerous containers each preferably having substantial buoyancy. For this reason each of the vertical guide members 64 will be anchored deeply in the solid sand, silt or mud buttom of the storage area and preferably fixed by embedding in concrete blocks 116 as shown in FIG. 2, or the entire bottom may be paved of concrete in which the upright members are embedded.

Inasmuch as the system is desired to protectively store strategic materials, the net 20 will extend entirely around the storage area and be fitted with a gate means 24, or opening in the net, open when substances to be stored are brought into or removed from the area.

The storage system may have various warning signal devices for prevention of theft, and particularly, approaching of enemy submarines. For this purpose, a sonar detection unit 118 is mounted to signal the approach of submarines or surface craft.

For additional protection foamite bottles 23 are disposed about the net for release of fire extinguishing materials, releasable by fire or explosion or responsive to various fire detection signals, as known in the art.

It is desirable for filling and removing of solid materials to fill and unload manually or by dry cargo handling devices. For this purpose, and as illustrated in FIG. 12, a container may be formed with a readily sealable man-hole or cover 120 capable of water tight securement as by bolting with bolts 122. One of the advantages of the present system is flexibility of movement of materials to be stored by sea. The entire cargo contained within large rubber containers is buoyant alone or combined with either a pallet or cradle. Several such containers are handleable by vertically hoisting aboard land craft several such containers usefully fastened together and towed by tugboat 66 as a sea train. That type of assembly is illustrated diagrammatically in FIG. 11.

As shown in the right-hand portion of FIG. 2, cables 88 attach to the corners of a cradle-container assembly and to the lower end of an upright H-beam. That cable itself serves in part to guide the assembly to emplacing position. It also can serve to lash the buoyant assembly into storage position. However, once emplaced, a cradle-container is readily latched in storage position by any conventional latching means, such as an extending pin, such as pin 102, mounted through one of the H-beams bearing against an end of a cradle arm 46 as shown in FIG. 8.

The system in operation is characterized by great flexibility to supply and withdraw materials or containers filled with materials to and from a submerged storage system. The materials are supplied and withdrawn by piping or by container-pallet or cradle combinations handled preferably as a buoyant unit. The entire system as described is protected by a substantial head of water from observation, from fire and explosion hazard to nearby cities and to the materials themselves, stored as strategically valuable supplies.

Numerous modifications and refinements of the present system will occur to those skilled in the art and, accordingly, it is intended that numerous details of description of the system be regarded as illustrative and not limiting except as defined in the claims appended hereto.

I claim:

1. An underwater storage system comprising a plurality of portable flexible-walled containers mounted protectively submerged underwater and a duct system interconnecting several of the containers with a common duct line extending at least to the water surface adapted to fill, discharge and equalize fluid contents of at least some of the submerged containers.

2. In an underwater storage system at least one portable fluid tight flexible walled storage container, a metallic cradle means supporting said container, the said combined container and cradle being adapted to float in water and rigidly fixed guide means permanently mounted in a storage area cooperating with said cradle adapted to guide said cradle and container to fixed submerged storage position, said guide means comprising a plurality of vertically extending beams disposed in spaced underwater storage position and shaped to guide and support between several, said cradle and container in vertical movement from floating buoyant position to submerged storage position, and a duct system permanently supported at least partially submerged adjacent the storage position of said container and cradle assembly and means interconnecting said container with said duct means for charge and discharge of fluid contents.

3. In an underwater storage system a plurality of vertical guide and support means for emplacing and supporting flexible-walled portable containers in fixed storage position underwater, said containers each having duct means, and a common duct system interconnecting each container duct with at least the water surface.

4. System as defined in claim 3 including valves controlling fluid flow to and from at least some of said containers, and means for remotely controlling fluid flow through said valves.

5. System as defined in claim 3 including valves controlling fluid flow to and from at least some of the containers and means selectively controlling fluid flow through each valve.

6. Underwater storage system comprising a series of flexible-walled portable containers secured together having common duct means for equalizing and discharging said system under water and pallet means for removably supporting and securing said portable containers as an integral part of said system.

7. In an underwater storage system a plurality of vertical guide and support means for emplacing and supporting flexible-walled portable containers in fixed storage position underwater, said vertical guide and support means being supported vertically from the underwater bottom storage site by being embedded in concrete, said containers having duct means and a common duct system interconnecting each container duct with at least one other and the water surface and valve control means in said duct system for control of charging and discharging of said container means under water.

8. In an underwater storage system several fluid-tight flexible-walled storage containers adapted to collapse, expelling their fluid contents under hydrostatic pressure, a metallic cradle means secured beneath, bracing and supporting each container, the said combined container and cradle being adapted to float in water, rigidly fixed guide means permanently mounted in an underwater storage area cooperating with each cradle adapted to guide the cradle to a fixed submerged storage position in said area, said guide means comprising a plurality of vertically extending beams spaced in underwater storage position and shaped to guide and support each cradle between several, in vertical movement from floating buoyant to submerged storage position, and a duct system permanently supported at least partially submerged adjacent to storage position of said container and cradle assemblies and means interconnecting said containers with said duct means for charge and discharge of fluid contents.

References Cited in the file of this patent

UNITED STATES PATENTS

| | | |
|---|---|---|
| 102,878 | Street | May 10, 1870 |
| 162,695 | Safely | Apr. 27, 1875 |
| 1,220,895 | Del Funga-Giera | Mar. 17, 1917 |
| 1,226,348 | McGray | May 15, 1917 |
| 1,859,322 | Wilson | May 24, 1932 |
| 1,900,319 | Vermeulen | Mar. 7, 1933 |
| 2,091,344 | Waterfall | Aug. 31, 1937 |
| 2,224,844 | Macfarren | Dec. 17, 1940 |
| 2,383,840 | Benckert | Aug. 28, 1945 |
| 2,398,828 | Gray | Apr. 23, 1946 |
| 2,449,320 | Raimondi | Sept. 14, 1948 |
| 2,480,144 | Laycock | Aug. 30, 1949 |
| 2,487,786 | Bogle | Nov. 15, 1949 |
| 2,594,105 | Watts | Apr. 22, 1952 |
| 2,659,603 | Glasser | Nov. 17, 1953 |
| 2,747,774 | Breitenbach | May 29, 1956 |
| 2,846,851 | Pelham | Aug. 12, 1958 |
| 2,895,301 | Casagrande | July 21, 1959 |
| 2,916,411 | Hunsucker | Dec. 8, 1959 |
| 2,923,268 | Fletcher | Feb. 2, 1960 |
| 2,928,411 | Johnson | Mar. 15, 1960 |
| 2,930,340 | Sessions | Mar. 29, 1960 |
| 2,944,403 | Smith | July 12, 1960 |
| 2,945,465 | Barton | July 19, 1960 |

FOREIGN PATENTS

| | | |
|---|---|---|
| 466,985 | Great Britain | June 9, 1937 |
| 212,031 | Australia | June 7, 1956 |